United States Patent [19]

Ardon et al.

[11] Patent Number: 5,119,366
[45] Date of Patent: Jun. 2, 1992

[54] CALL PROCESSING METHOD FOR DISTRIBUTED SWITCHING

[75] Inventors: Menachem T. Ardon; Gustavus H. Zimmerman, III, both of Naperville, Ill.

[73] Assignee: AT&T Bell Laboratories, Murray Hill, N.J.

[21] Appl. No.: 628,918

[22] Filed: Dec. 14, 1990

[51] Int. Cl.⁵ ........................ H04Q 3/42; H04Q 11/04
[52] U.S. Cl. ................................... 370/54; 370/58.3; 279/269
[58] Field of Search .................... 370/16, 53, 54, 58.1, 370/58.2, 58.3, 63, 66, 67, 85.1, 95.1, 110.1; 379/242, 258, 268, 269, 219, 220, 221, 271, 272, 273; 340/825.03, 825.06, 826, 827; 371/8.1, 8.2, 11.1

[56] References Cited

U.S. PATENT DOCUMENTS

| | | | |
|---|---|---|---|
| 4,322,843 | 3/1982 | Beuscher et al. | 370/63 |
| 4,621,357 | 11/1986 | Naiman et al. | 370/58 |
| 4,683,584 | 7/1987 | Chang et al. | 379/269 |
| 4,694,487 | 9/1987 | Chang et al. | 379/269 |
| 4,720,854 | 1/1988 | Sand | 370/58.3 |
| 4,805,166 | 2/1989 | Ardon et al. | 370/54 |
| 4,866,708 | 9/1989 | Ardon et al. | 370/95.1 |
| 4,943,999 | 7/1990 | Ardon | 379/221 |

OTHER PUBLICATIONS

AT&T 356-301-004 "DACS IV (Digital Access and Crossconnect System IV)".
AT&T Technical Journal, Jul.-Aug. 1985, vol. 64, Part 2.

Primary Examiner—Douglas W. Olms
Assistant Examiner—Alpus H. Hsu
Attorney, Agent, or Firm—Ross T. Watland

[57] ABSTRACT

A call processing method for distributed switching which substantially increases the percentage of calls that are intra-module calls by distributing the members of trunk groups among a plurality of switching modules and biasing the processing of a call originating on one switching module such that an available trunk group member on that same switching module is assigned to the call if possible. The path hunt function for intra-module calls is separated from the corresponding function for inter-module calls and only the latter function is performed by the system central control. The separation is achieved by dividing the set of switch path resources, e.g., channels or time slots, associated with a switching module into two disjoint subsets—a first subset for intra-module call connections and a second subset for inter-module call connections.

23 Claims, 10 Drawing Sheets

22
SECOND SWITCH PATH AVAILABILITY DATA STORED BY CM 12000
(0=AVAILABLE, 1=NOT AVAILABLE)

| | 384 | 385 | 386 | 387 | 388 | ... | 511 |
|---|---|---|---|---|---|---|---|
| SM 13000-1 | 1 | 0 | 1 | 0 | 0 | ............ | 0 |
| SM 13000-2 | 1 | 0 | 1 | 1 | 1 | ............ | 1 |
| SM 13000-3 | 1 | 1 | 1 | 1 | 0 | ............ | 0 |
| SM 13000-4 | 1 | 0 | 1 | 0 | 1 | ............ | 0 |

*FIG. 5*

34
FIRST SWITCH PATH AVAILABILITY DATA STORED BY SM 13000-1
(0=AVAILABLE, 1=NOT AVAILABLE)

| 0 | 1 | 2 | 3 | 4 | ... | 383 |
|---|---|---|---|---|---|---|
| 0 | 0 | 0 | 1 | 0 | ............ | 1 |

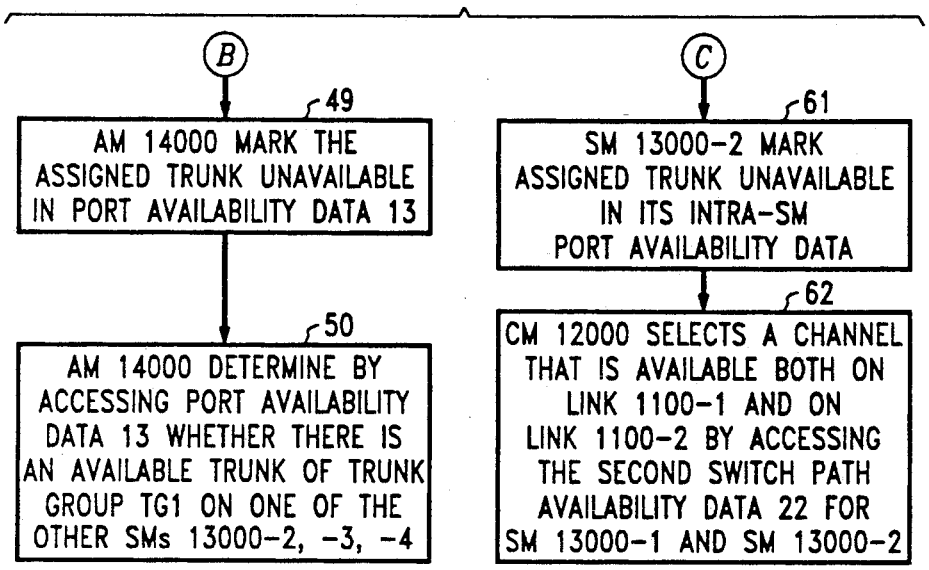

49 — AM 14000 MARK THE ASSIGNED TRUNK UNAVAILABLE IN PORT AVAILABILITY DATA 13

50 — AM 14000 DETERMINE BY ACCESSING PORT AVAILABILITY DATA 13 WHETHER THERE IS AN AVAILABLE TRUNK OF TRUNK GROUP TG1 ON ONE OF THE OTHER SMs 13000-2, -3, -4

61 — SM 13000-2 MARK ASSIGNED TRUNK UNAVAILABLE IN ITS INTRA-SM PORT AVAILABILITY DATA

62 — CM 12000 SELECTS A CHANNEL THAT IS AVAILABLE BOTH ON LINK 1100-1 AND ON LINK 1100-2 BY ACCESSING THE SECOND SWITCH PATH AVAILABILITY DATA 22 FOR SM 13000-1 AND SM 13000-2

FIG. 10

| EMBODIMENT | I | II | III | IV |
|---|---|---|---|---|
| TRUNK ASSIGNMENT FOR INTRA-SM 13000-1 CALLS | SM 13000-1 | AM 14000 | AM 14000 | SM 13000-1 |
| TRUNK ASSIGNMENT FOR INTER-SM CALLS | AM 14000 | AM 14000 | AM 14000 | AM 14000 |
| PATH HUNT FOR INTRA-SM 13000-1 CALLS | SM 13000-1 | CM 12000 | SM 13000-1 | CM 12000 |
| PATH HUNT FOR INTER-SM CALLS | CM 12000 | CM 12000 | CM 12000 | CM 12000 |

| (FIG. 11a) | (FIG. 11b) | (FIG. 11c) |

CALL PROCESSING METHOD FOR DISTRIBUTED SWITCHING

TECHNICAL FIELD

This invention relates to telecommunications.

BACKGROUND AND PROBLEM

A distributed switching system is one comprised of a plurality of switch units which interface customer lines and trunks on a peripheral side of the unit and which interface a central switch arrangement on the other side of the unit. Calls between customers and/or trunks connected to different switch units are completed through the central switch. The AT&T system disclosed in the *AT&T Technical Journal*, July-August 1985, No. 6, Part Two, is a time division switching system where the switching function is distributed to a plurality of switching modules (SMs), each connected to a number of lines and/or trunks. Each SM provides connections among the lines and trunks connected to that module. Calls involving lines or trunks connected to different SMs are completed through a time-multiplexed switch (TMS) that interconnects the SMs. Each SM includes a control unit that controls the switching function of that SM. The system also includes a central control that controls the switching function of the TMS. All calls within the system require the selection of what is referred to as a network time slot. For inter-module calls, the network time slot is used for transmission from one SM, through the TMS, to another SM. The same network time slot is used for both directions of transmission. For intra-module calls, the network time slot is used within the SM to connect one line or trunk to another line or trunk. Two network time slots are used for intra-module calls, one for each transmission direction. Although the call processing function is distributed in the system in that the real-time intensive tasks associated with calls, e.g., signal processing, are performed by the switching module control units, the functions of selecting the network time slot and setting up the TMS path if the call is an inter-module call, are centralized, being performed by the central control. There are 512 channels (time slots) TS0 through TS511 between a given SM and the TMS. Setting up a path for an inter-module call between two SMs involves finding a channel that is available on the link to the first SM, for example TS44, and that has a corresponding available channel TS44 on the link to the second SM. The central control stores an availability bit map for each of the links to the SMs for use in performing the network time slot selection function. Even though no TMS path is required for an intra-module call, the two network time slots assigned to the call are not otherwise usable. Therefore the network time selection (or path hunt) function is performed by the central control for both intra-module calls and inter-module calls.

One of the important advantages of a modular system of this type is that its capacity can be closely matched to the requirements of specific applications. However, as the system becomes larger, the performance of per call tasks, such as network time slot selection, by a central control for all calls, imposes an upper limit on the overall system call processing capacity.

SOLUTION

This limitation is eased and a technical advance is achieved in accordance with the principles of the invention in an exemplary call processing method for distributed switching which substantially increases the percentage of calls that are intra-module calls by distributing the members of trunk groups among the switching modules and, in a departure in the art, biasing the processing of a call originating on one switching module such that an available trunk group member on that same switching module is assigned to the call if possible. Illustratively, the network time slot selection function for intra-module calls is advantageously separated from the corresponding function for inter-module calls and only the latter function is now performed by the system central control. The separation is achieved by dividing the set of switch path resources, e.g., channels or time slots, associated with a switching module into two disjoint subsets—a first subset for intra-module call connections and a second subset for inter-module call connections. Switch path availability data for the two subsets are separately and independently stored and accessed. Not only does this separation result in a reduced processing load on the central control, but it simplifies the transition of a switching module from operation as a stand-alone entity, for example during a failure condition, to operation as an integrated element of the distributed switching system. The increased percentage of calls that are intra-module calls also results in reduced message traffic requirements between switching module control units.

A method in accordance with the invention is used in a switching system that provides switched connections among a plurality of ports including a plurality of multi-port hunt groups, i.e., trunk groups and multi-line hunt groups. The switching system comprises a plurality of distributed switch means (e.g., switching modules) each associated with a corresponding subset of the ports and providing switched connections to and from the corresponding subset of ports, and a central switch means (e.g., communications module) that provides switched connections among the distributed switch means. The method is used to process a call to one of the groups from an originating port associated with one of the distributed switch means. In response to the call, a determination is made as to whether there is a port associated with the one distributed switch means that is a member of the one group and that is also presently available. If the determination yields an affirmative result, the determined port is assigned to the call. If the determination yields a negative result, a further determination is made as to whether there is a port associated with another one of the distributed switch means that is a member of the one group and that is also presently available. If the further determination yields a positive result, the determined port is assigned to the call.

Illustratively, the switching system includes a central control means and a plurality of distributed control means, where one of the distributed control means is associated with the one distributed switch means of the originating port. The first port availability determination is performable by either the central control means or the one distributed control means independently of the further port availability determination by the central control means.

The switching system control structure stores first switch path availability data for a first set of path resources of the switching system for use only for switched connections for intra-module calls, and second switch path availability data for a second set of path resources of the switching system for use only for switched connections for inter-module calls. Once a port is assigned to a call, the connection is established by accessing either the first switch path availability data or the second switch path availability data, but not both. The first switch path availability data may be stored by either the one distributed control means or the central control means (or both for backup purposes). Illustratively, the one distributed switch means is a time switch and the path resources comprise time slots.

DRAWING DESCRIPTION

Figure 4:
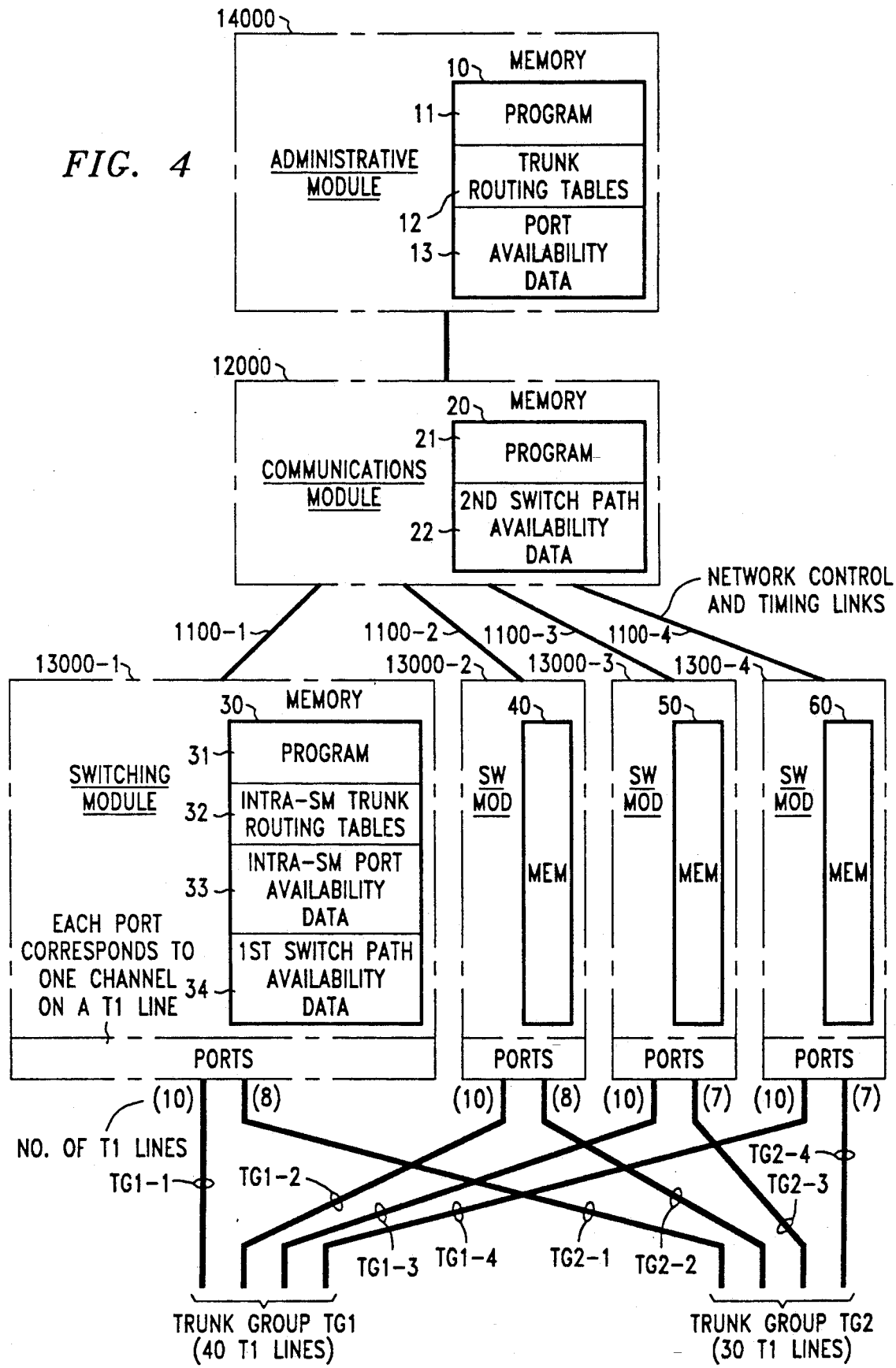
FIG. 4 is a diagram of a distributed switching system comprising an exemplary embodiment of the present invention.
Figure 7:
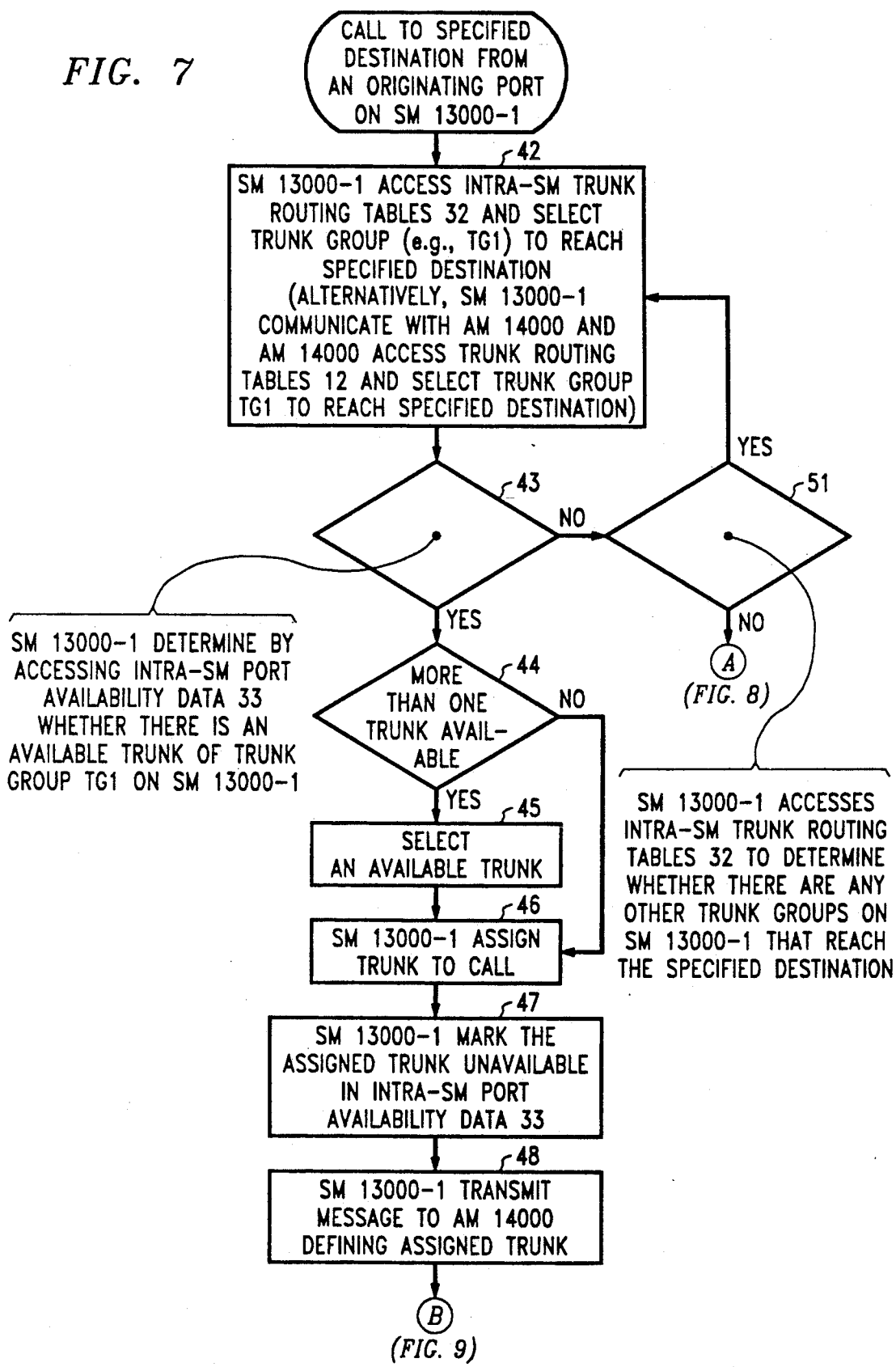
Figure 8:
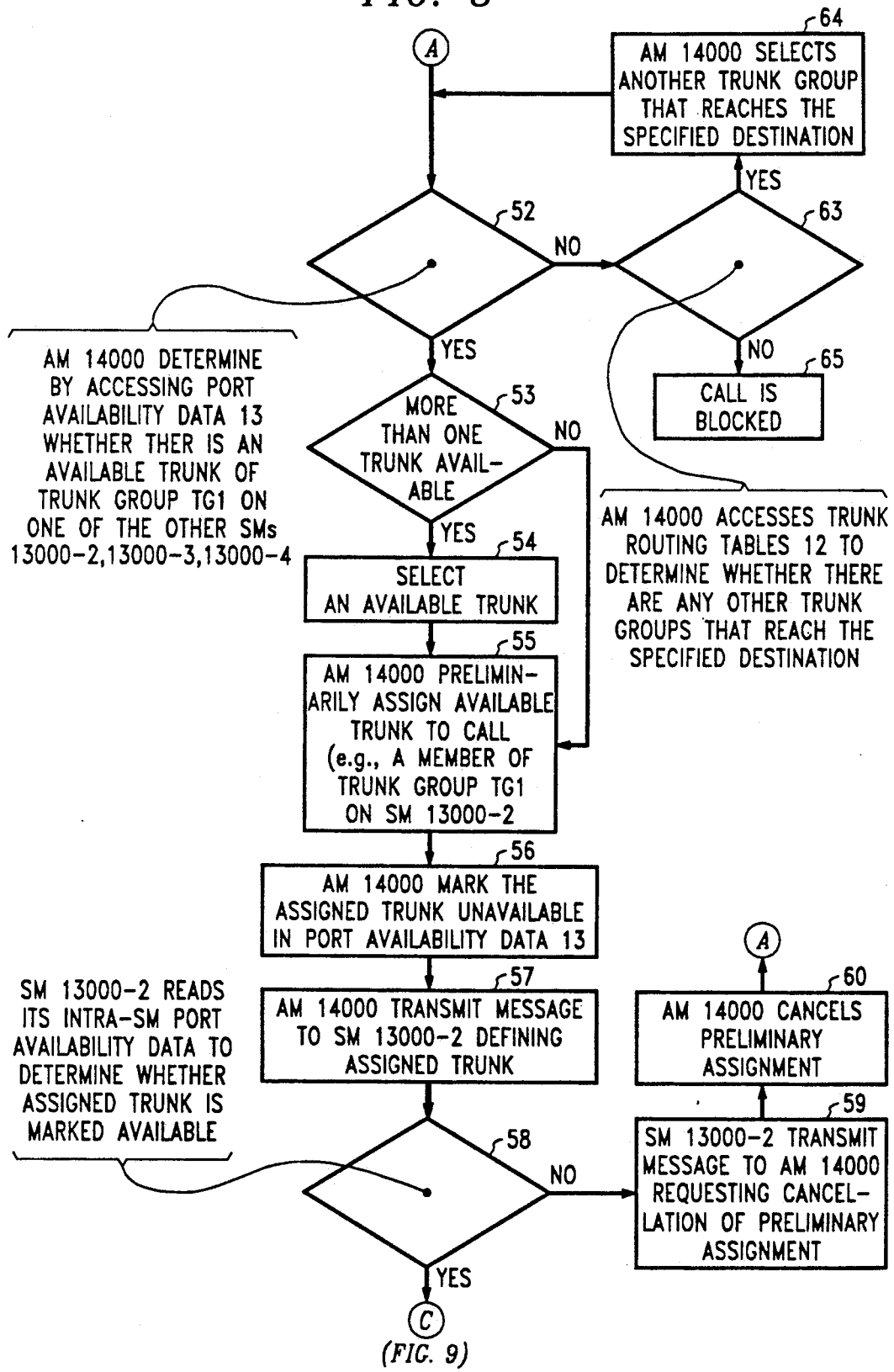

FIGS. 5 and 6 provide detail concerning memory facilities in the system of FIG. 4;

FIGS. 7-9 comprise a flow chart of steps for processing calls in the system of FIG. 4;

FIG. 10 is a chart defining four embodiments of the system of FIG. 4; and

Figure 11A:
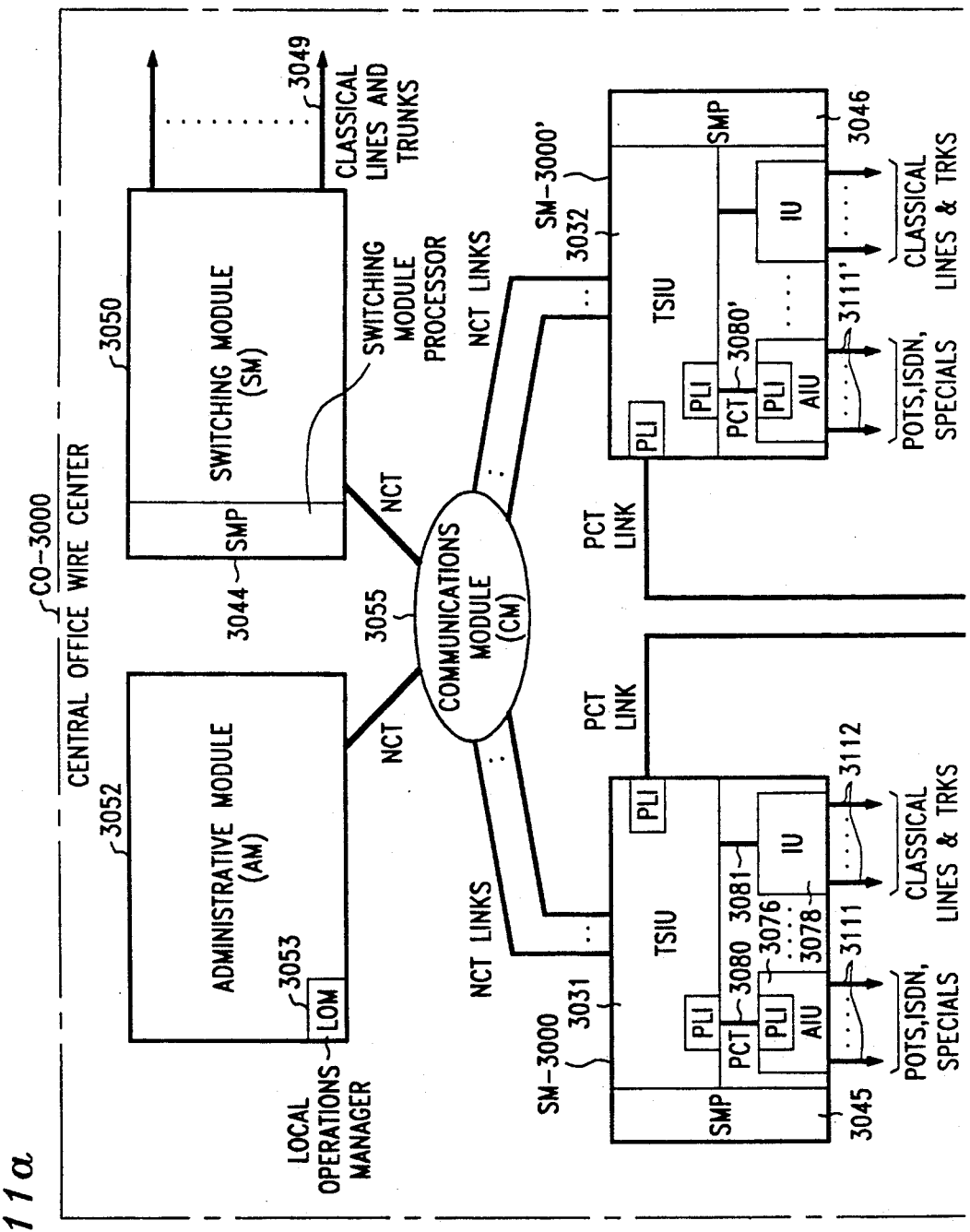
Figure 11B:
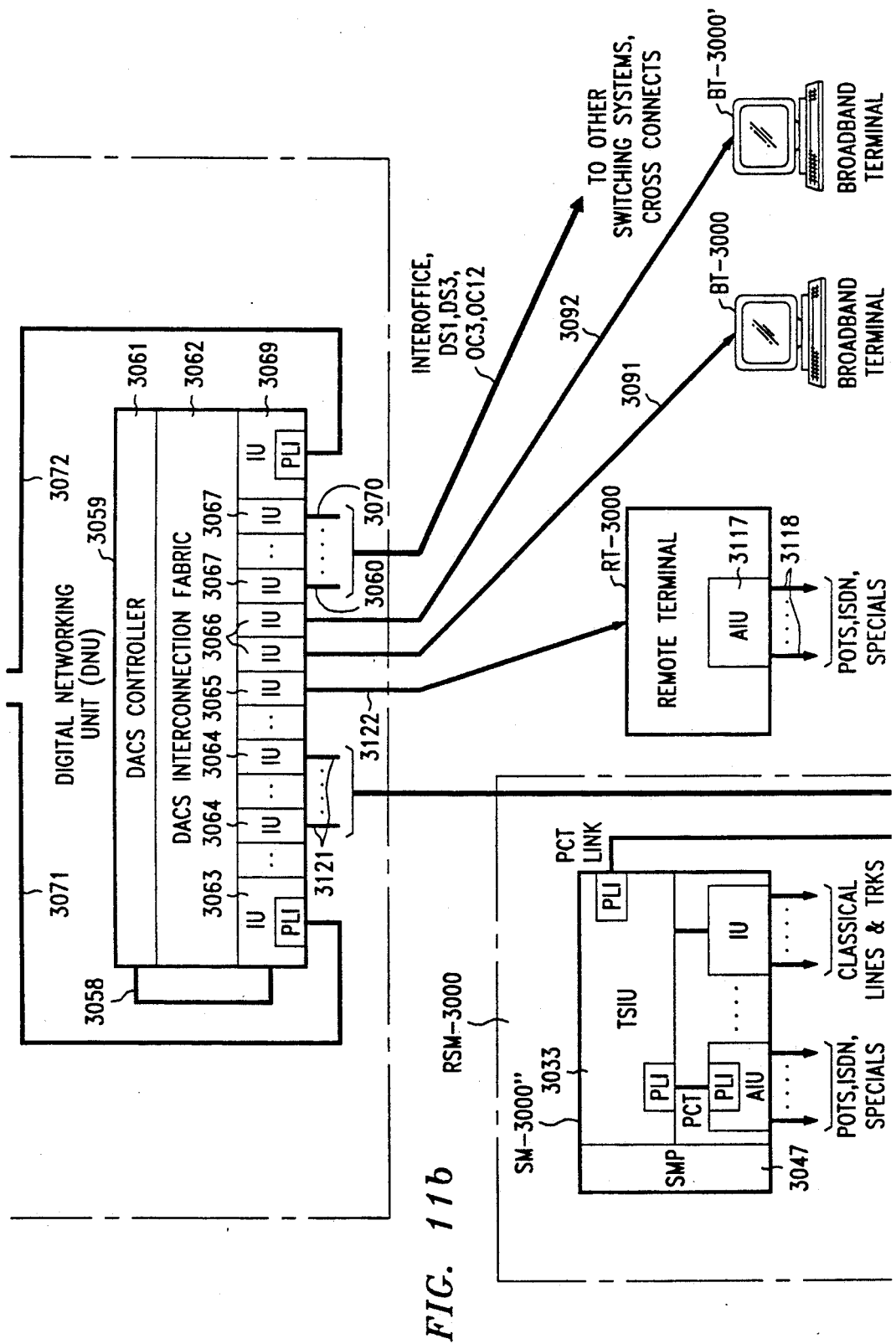
Figures 11, 11C:
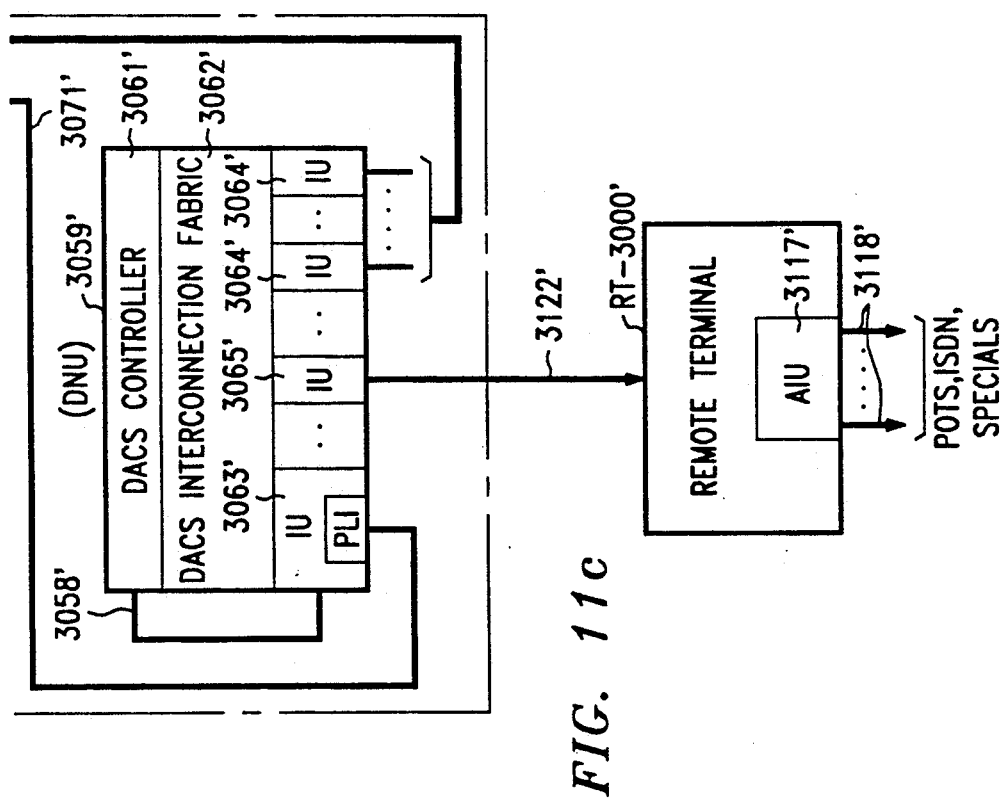

FIGS. 11a, 11b, 11c (arranged as in FIG. 11) is a diagram of an alternative embodiment also employing the call processing method of the present invention.

DETAILED DESCRIPTION

The following description is arranged in three parts: (1) the AT&T 5ESS ® Switch is described as it exist in the prior art; (2) call processing in an exemplary embodiment of the invention is described in terms of departures over the prior art system; and (3) modifications and additions to the 5ESS Switch are described which provide the integration of an interconnection arrangement (based generally on the AT&T DACS IV digital access and crossconnect system described in the publication AT&T 365-301-004 "DACS IV (Digital Access and Crossconnect System IV) with a switching system under a common control structure, in a central office wire center CO-3000 where the call processing method of the invention is also applicable.

PRIOR ART SYSTEM 1000

Figure 1:
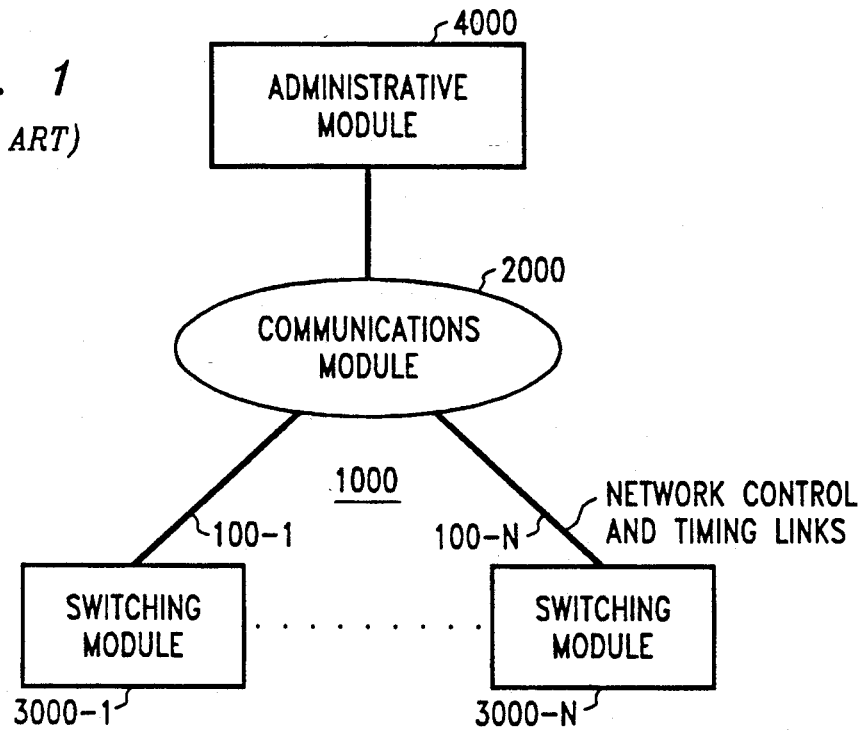
FIGS. 1-3 are diagrams of a prior art switching system.
Figure 2:
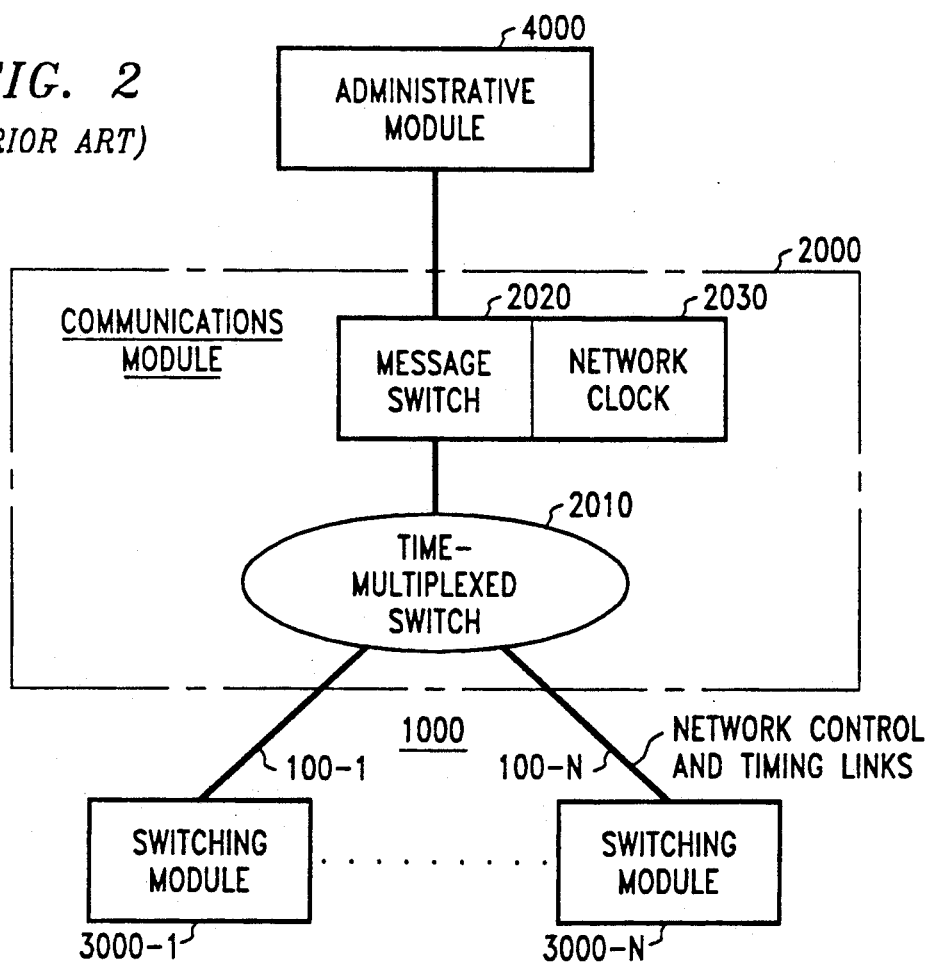
Figure 3:
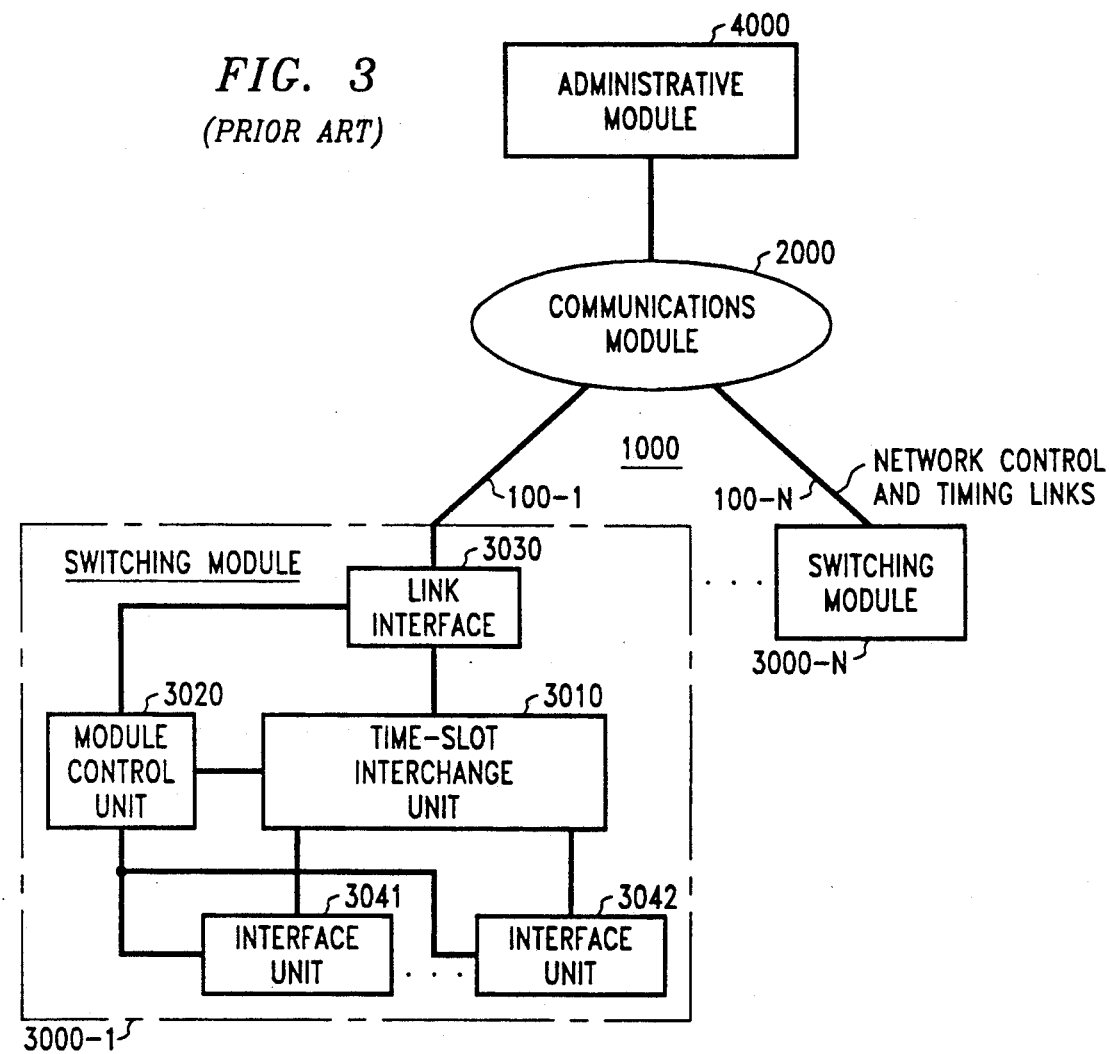

FIGS. 1-3 are used to describe the prior art switching system 1000. The AT&T Technical Journal, July-August 1985, Vol. 64, No. 6, Part 2, U.S. Pat. No. 4,322,843 issued to H. J. Beuscher et al. on Mar. 30, 1982, U.S. Pat. No. 4,683,584 issued to S. Change et al. on Jul. 27, 1987 and U.S. Pat. No. 4,621,357 issued to S. Naiman et al. on Nov. 4, 1986 describe aspects of the system in detail.

Switching system 1000 (FIG. 1) has three major components: an administrative module (AM) 4000 that provides systemwide administration, maintenance, and resource allocation; a communications module (CM) 2000 that provides a hub for distributing and switching voice or digital data, control information, and synchronization signals; and a number of switching modules (SMs) 3000-1, 3000-N that perform local switching and control functions and that provide interfaces to subscriber lines and interexchange circuits.

AM 4000 provides the system-level interfaces required to operate, administer, and maintain system 1000. It performs functions that can most economically be done globally, such as common resource allocation and maintenance control. For reliability, AM 4000 includes fully duplicated processors and the two processors work in an active/standby configuration. In normal operation the active processor has control and, at the same time, keeps the data in the standby processor up to date. Thus when a fault occurs in the active processor, the standby processor is switched into service with no loss of data.

AM 4000 performs many call-processing support functions, including systemwide craft maintenance access, diagnostic and exercise control and scheduling, software recovery and initialization, and certain fault-recovery and error-detection functions best done on a centralized basis. Within AM 4000, there is error-checking circuitry for detecting and isolating faults. AM 4000 also performs administrative functions and provides software access to external data links and to disk storage (not shown).

The basic function of CM 2000 (FIG. 2) is to provide consistent communications between the SMs, and between AM 4000 and the SMs. A message switch (MSGS) 2020 transfers call-processing and administrative messages between the SMs and AM 4000, and between any two SMs. MSGS 2020 performs a packet-switching function within system 1000 utilizing the well-known X.25 level-2 protocol to transfer control messages through CM 2000 and its terminating network control and timing (NCT) links 100-1, 100-N. This protocol includes error detection, positive message acknowledgment, and message retransmission in the event of a transmission error. A network clock 2030 provides the clock signals that synchronize the time-division network. Clock 2030 is synchronized through an external source or runs on an internal reference basis with periodic updating.

System 1000 uses a time-space-time architecture. As illustrated in FIG. 3, a time-slot interchange unit (TSIU) in each SM performs the time-division switching; a time-multiplexed switch (TMS) 2010 in CM 2000 (FIG. 2) performs the time-shared space-division switching. At each interface unit (FIG. 3) the outputs from lines and trunks are converted into 16-bit time slots. These bits are used for signaling, control, and parity, and for binary-coded voice or data. The time slots are switched through the TSIU and time-multiplexed on NCT links to TMS 2010.

TMS 2010 (FIG. 2) is a single-stage switching network that provides the digital paths for switched connections between the modules and for control messages among modules. TMS 2010 interconnects the modules via the NCT links. Each NCT link carries 256 channels (time slots) of multiplexed data in a 32.768-Mb/s serial bit stream. One of the time slots carries control messages, and the remaining 255 time slots carry digitized voice or data. Two NCT links are associated with each switching module, thus allowing 512 time slots to be routed to and from TMS 2010. (However, only a single line 100-1 is shown in the drawing to represent both NCT links between SM 3000-1 and CM 2000.) Setting up a path between a line or trunk on two SMs involves finding an idle time slot on one of the NCT links to each SM. A path is then set up through TMS 2010 between the two NCT links using the selected time slot. The TSIU in each SM establishes a path between the selected NCT time slot and the peripheral time slot associated with the line or trunk. (Since the paths are bidirectional, one NCT time slot is needed for each direction of transmission. In the present embodiment however, the time slots for the two directions are selected to have the same number.)

One of the signaling bits of the 16-bit time slots on the NCT links to TMS 2010, referred to as the E-bit, is used for continuity verification between SMs after an inter-SM call has been set up through TMS 2010. For example, after a call between SM 3000-1 and SM 3000-N has been set up through TMS 2010 using a particular time slot, both SM 3000-1 and SM 3000-N begin transmitting a logic one E-bit in the particular time slot as a continuity signal and both also begin scanning the E-bit of the particular time slot received from the other SM. The call setup procedure is not considered complete until both SM 3000-1 and SM 3000-N have detected the E-bit continuity signal from the other SM.

SMs such as SM 3000-1 (FIG. 3) provide call-processing intelligence, the first stage of switching network, and line and trunk terminals. SMs differ in the types and quantities of interface equipment they contain, depending upon the characteristics of the lines or trunks terminating thereon. Certain equipment is however, common to all SMs. The common equipment includes a link interface 3030, a TSIU 3010, and a module control unit 3020. Link interface 3030 provides a two-way interface between each SM and TMS 2010 in CM 2000. Module control unit 3020 controls call processing, call distribution, and maintenance functions. A variety of interface units 3041, 3042 are available in system 1000. Line units provide interfaces to analog lines. Trunk units provide interfaces to analog trunks. Digital line trunk units provide interfaces to digital trunks and remote SMs, while digital carrier line units provide the interface to digital carrier systems. Integrated services line units provide interfaces to digital ISDN lines. Each SM can accommodate any mixture of these units, with up to 510 channels. Two time slots are used for control.

TSIU 3010 includes a signal processor, which handles address and signaling information and a control interface, which distributes control signals to and from the interface units. TSIU 3010 switches time slots between the interface units in an SM and connects time slots from the interface units to time slots on NCT links. TSIU 3010 switches 512 time slots—256 from each of the NCT links between SM 3000-1 and CM 2000—and 512 peripheral time slots from the interface units. TSIU 3010 can connect any of its 512 peripheral time slots to any other peripheral time slot, or to any time slot of either NCT link to CM 2000.

System 1000 is a time division switching system where the switching function is distributed to the plurality of SMs 3000-1, 3000-N, each connected to a number of lines and/or trunks. Each SM provides connections among the lines and trunks connected to that module. Calls involving lines or trunks connected to different SMs are completed through TMS 2010 that interconnects the SMs. Each SM includes a control unit, e.g., module control unit 3020, that controls the switching function of that SM. System 1000 also includes a central control, e.g., AM 4000, that controls the switching function of TMS 2010. All calls within system 1000 require the selection of what is referred to as a network time slot. For inter-module calls, the network time slot is used for transmission from one SM, through TMS 2010, to another SM. The same network time slot is used for both directions of transmission. For intra-module calls, the network time slot is used within the SM to connect one line or trunk to another line or trunk. Two network time slots are used for intra-module calls, one for each transmission direction. Although the call processing function is distributed in system 1000 in that the realtime intensive tasks associated with calls, e.g., signal processing, are performed by the switching module control units, the functions of selecting the network time slot and setting up the TMS 2010 path if the call is an inter-module call, are centralized, being performed by AM 4000.

Recall that there are 512 channels (time slots) TS0 through TS 511 between a given SM and TMS 2010 (FIG. 2) and that setting up a path for an inter-module call between SM 3000-1 and SM 3000-N involves finding a channel that is available on link 100-1, for example TS44, and that has a corresponding available channel TS44 on link 100-N. AM 4000 stores an availability bit map for each of the links 100-1 through 100-N for use in performing the network time slot selection function. For each time slot marked not available on a given link, AM 4000 also stores information defining the connection through TMS 2010 to one of the other links. Network time slots are again marked available and the connection information deleted in AM 4000 after a call ends. (For reasons of efficient processing, this operation may be deferred until a predetermined number of call disconnects, e.g., 15, occur or a predefined time elapses.) However, the path or connection through TMS 2010 is not removed after the call ends. As described in the above-referenced U.S. Pat. No. 4,621,357 of S. Naiman et al., TMS 2010 removes connections only as necessary to establish a new connection. The information defining established TMS 2010 connections is stored only within TMS 2010 in system 1000, and the network time slot selection function (also referred to herein as the available path selection function) is performed without reference to such information.

EXEMPLARY EMBODIMENT OF THE INVENTION

FIG. 4 is a block diagram of distributed switching system 11000 comprising an exemplary embodiment of the present invention. System 11000 corresponds generally to the prior art system 1000 with the elements in system 11000 being numbered with numbers having an additional initial "1" with respect to the numbers of the corresponding elements of system 1000. System 11000 differs from system 1000 as described in detail herein and particularly with respect to the processing of calls to multi-port hunt groups, i.e., trunk groups or multi-line hunt groups, and with respect to the efficient and independent processing of intra-SM calls and inter-SM calls. Trunk groups, for example, are advantageously distributed across SMs and call processing is effected such that calls are completed as intra-SM calls if possible. In the present example, system 11000 operates as a tandem switch for switching only trunks and comprises four SMs 13000-1, 13000-2, 13000-3, and 13000-4. Trunk group TG1 comprising 40 T1 lines and trunk group TG2 comprising 30 T1 lines are illustratively shown in FIG. 4. Note that trunk group TG1 is split into four subgroups TG1-1, TG1-2, TG1-3, and TG1-4 (each comprising ten T1 lines) connected to SMs 13000-1, 13000-2, 13000-3, and 13000-4 respectively, and that trunk group TG2 is split into two subgroups TG2-1 and TG2-2 (each comprising eight T1 lines) connected to SMs 13000-1 and 13000-2 respectively, and two subgroups TG2-3 and TG2-4 (each comprising seven T1 lines) connected to SMs 13000-3 and 13000-4 respectively.

In the embodiment of FIG. 4, communications module 12000 includes a communications module processor (not shown) and associated memory 20 which are used to perform many of the centralized system functions, e.g., path hunt (network time slot selection), performed by AM 4000 in system 1000. The memory facilities associated with AM 14000, CM 12000, and SMs 13000-1 through 13000-4 are represented in FIG. 4 by memories 10, 20 and 30 through 60 respectively. Memory 10 associated with AM 14000 stores a program 11, trunk routing tables 12 used to select the outgoing trunk group for an incoming call, and port availability data 13 for all ports of system 11000. (A system 11000 port corresponds to one channel on a T1 line.) Memory 30 associated with SM 13000-1 stores a program 31 and intra-SM trunk routing tables 32 used to select the outgoing trunk group for an incoming call either in normal system operation or where SM 13000-1 is operating in a stand-alone mode. Memory 20 also stores intra-SM port availability data 33 for the subset of the system 11000 ports on SM 13000-1, and first switch path availability data 34 as shown in FIG. 6. Each SM, e.g., SM 13000-1, has associated switch path resources—the 512 channels TS0 through TS511 on the link between that SM and CM 12000, e.g., link 1100-1 between SM 13000-1 and CM 12000. In the present exemplary embodiment, the set of switch path resources associated with a given SM is divided into two disjoint subsets—channels TS0 through TS383 in a first subset, and channels TS384 through TS511 in a second subset, and the availability data for the two subsets are stored and accessed separately. The first switch path availability data 34 (FIG. 6) stored in memory 30 defines the availability of the first subset comprising channels TS0 through TS383 associated with SM 13000-1. Memory 20 associated with CM 12000 stores a program 22 and second switch path availability data 22 (FIG. 5) defining the availability of the second subset comprising channels TS384 through TS511 associated with each of the SMs 13000-1, 13000-2, 13000-3, and 13000-4. Call processing is controlled such that intra-SM calls use switch path resources of only the first subset and inter-SM calls use switch path resources of only the second subset. Since the exemplary call processing method causes the majority of all calls to be intra-SM calls, ¾ of the channels are included in the first subset. Other apportionments between the first and second subsets would be made depending on the anticipated traffic. Although each SM has its switch path resources apportioned between the first and second subsets in the same ratio in the present embodiment, this may also be adjusted if warranted based on traffic or other considerations.

FIGS. 7-9 comprise a flow chart depicting the steps involved in processing calls in system 11000. Execution is initiated in response to a call request for a call to a specified destination from an originating port on SM 13000-1, for example. In block 42, SM 13000-1 accesses intra-SM trunk routing tables 32 and selects a trunk group, e.g., trunk group TG1, to reach the specified destination. Execution proceeds to decision block 43 where SM 13000-1 determines by accessing intra-SM port availability data 33 whether there is an available trunk of trunk group TG1 on SM 13000-1. If there is, a further determination is made in decision block 44 whether there is more than one such available trunk. If there is only one available trunk, SM 13000-1 assigns that trunk to the call in block 46. If two or more trunks of trunk group TG1 are presently available on SM 13000-1, SM 13000-1 selects one in block 45 and assigns the selected trunk to the call in block 46. Execution proceeds to block 47 where SM 13000-1 marks the assigned trunk unavailable in intra-SM port availability data 33, and to block 48 where SM 13000-1 transmits a message to AM 14000 defining the assigned trunk. In response to the message, AM 14000 in block 49 marks the assigned trunk unavailable in port availability data 13. In block 50, SM 13000-1 selects two channels that are available for the intra-SM call by accessing the first switch path availability data 34. The remaining steps required to complete the processing of the call are performed, e.g., completing the switch path for the connection and controlling call signaling and disconnection.

Returning to decision block 43, if SM 13000-1 determines that there is no available trunk of trunk group TG1 on SM 13000-1, execution proceeds to decision block 51 and SM 13000-1 makes a further determination as to whether there are any other trunk groups on SM 13000-1 that reach the specified destination. If there are other trunk groups, execution returns to block 42, where one is selected and the above-described steps beginning with decision block 43 are repeated. If SM 13000-1 determines in block 51 that there are no other trunk groups on SM 13000-1 that reach the specified destination, execution proceeds to decision block 52. In decision block 52, AM 14000 accesses port availability data 13 to determine whether there is an available trunk of trunk group TG1 on one of the other SMs 13000-2, 13000-3, 13000-4. If there is, a further determination is made in decision block 53 whether there is more than one such available trunk. If there is only one available trunk, AM 14000 preliminarily assigns that trunk to the call in block 55. If two or more such trunks are presently available, AM 14000 selects one in block 54 and preliminarily assigns the selected trunk to the call in block 55. Assume for example, that a trunk that is a member of trunk group TG1 on SM 13000-2 is assigned to the call. Execution proceeds to block 56 where AM 14000 marks the assigned trunk unavailable in port availability data 13, and to block 57 where AM 14000 transmits a message to SM 13000-2 defining the assigned trunk. In response to the message, SM 13000-2 in decision block 58 reads its intra-SM port availability data to determine whether the assigned trunk is marked available. If the assigned trunk is marked unavailable, execution proceeds to block 59 where SM 13000-2 transmits a message to AM 14000 requesting cancellation of the preliminary assignment of the trunk to the call. In response to the message, AM 14000 cancels the preliminary assignment in block 60.

Returning to decision block 58, if SM 13000-2 determines that the assigned trunk is marked available, execution proceeds instead to block 61 where SM 13000-2 marks the assigned trunk unavailable in its intra-SM port availability data. Then in block 62 CM 12000 selects a channel that is available both on link 1100-1 and on link 1100-2 by accessing the second switch path availability data 22 (stored in memory 20) for SM 13000-1 and SM 13000-2. The remaining steps required to complete the processing of the call are then performed.

Returning to decision block 52, if AM 14000 determines that there is no available trunk of trunk group TG1 on one of the other SMs 13000-2, 13000-3, 13000-4, execution proceeds to decision block 63. In block 63, AM 14000 accesses trunk routing tables 12 to determine whether there are any other trunk groups that reach the specified destination. If there are none, execution proceeds to block 65 and the call is blocked. If there are other trunk groups that reach the specified destination, execution proceeds from block 63 to block 64 where AM 14000 selects one of the other trunk groups and then to block 52 for further processing as already described.

Note that in the particular embodiment of system 11000 described above, AM 14000 performs the trunk assignment function for inter-SM calls, CM 12000 performs the path hunt function for inter-SM calls, and SM 13000-1 performs both the trunk assignment and path hunt functions for intra-SM calls. This particular embodiment is labelled embodiment I in FIG. 10, which lists alternative embodiments II, III, and IV.

Although the above-described method was applied to trunk groups, similar processing steps may be advantageously applied to multi-line hunt groups having members distributed across SMs. In addition, the independent processing of intra-SM and inter-SM calls and the separate storing and accessing of first switch path availability data and second switch path availability data may be utilized for calls to individual lines as well. Independent processing of intra-SM and inter-SM calls is particularly advantageous for simplifying transitions from stand-alone SM 13000-1 operation to normal system 11000 operation.

ALTERNATIVE EMBODIMENT

Central Office Wire Center CO-3000

FIGS. 11a, 11b, and 11c comprise a diagram of an architecture for an alternative embodiment of a central office wire center CO-3000 where a switching system and a DACS are integrated under the common control of an administrative module (AM) 3052. In FIGS. 11a, 11b, and 11c, the DACS functionality is implemented by a digital networking unit (DNU) 3059. The other elements in FIGS. 11a, 11b, and 11c are elements of a switching system based on the architecture of system 1000 (FIG. 1) but with modifications and additions as described herein.

CO-3000 includes one or more switching modules, SM-3000, SM-3000', which, like the conventional switching modules of the prior art system, perform time-switching functions under the control of a distributed module control unit or switching module processor (SMP) 3045, 3046. However, switching modules SM-3000 and SM-3000' are substantially larger than conventional switching modules and can switch approximately 16K peripheral time slots and 16K network time slots. Also included as part of the switching system is a remote switching module RSM-3000, controlled by SMP 3047, and a remote terminal RT-3000, both located at a distance from CO-3000, and interconnected with CO-3000 via fiber links 3121 and 3122. A second remote terminal RT-3000' is located at a distance from RSM-3000 and is interconnected therewith via fiber link 3122'. Conventional switching modules such as SM 3050 controlled by SMP 3044 and providing service to lines and trunks 3049, may also be included in the same system.

SM-3000 includes a time-slot interchange unit (TSIU) 3031 which switches time slots between interface units, e.g., access interface unit (AIU) 3076 connected via peripheral control and timing (PCT) link 3080, and interface unit 3078 representing one of the line and trunk units of the prior art system (FIG. 10) and described in the referenced *AT&T Technical Journal*, July–August 1985, Vol. 64, No. 6, Part 2. TSIU 3031 connects time slots from the peripheral interface units to time slots on network control and timing (NCT) links to communications module 3055. AIU 3076 provides the system interface to lines 3111 including POTS (plain old telephone service), ISDN (integrated services digital network) and special lines. AIU 3076 provides the typical functionality (battery, overvoltage, ringing, supervision, coding/decoding, hybrid, testing) for analog lines, and terminates the standard B and D channels for ISDN lines. Special lines include lines to private branch exchanges, foreign exchanges, etc. The PCT links, e.g., 3080, 3071, are terminated at both ends by peripheral link interfaces (PLIs). Note that DNU 3059 is connected as a peripheral unit.

In the present exemplary embodiment, the NCT and PCT fiber optic links transmit data at approximately 65 megahertz and each comprise 1024, eight-bit time slots. The number of NCT links is engineered dependent on the amount of inter-module traffic. SM-3000 can connect any of its peripheral time slots to any other peripheral time slot, or to any of the network time slots on NCT links. Within CM 2055, a given NCT link is divided into lines each comprising 256 time slots, for switching by a time-multiplexed, space-division switch to the other switching modules.

DNU 3059, based on the above-referenced DACS IV, includes a DACS controller 3061, which operates in response to commands from SMP 3045 via PCT link 3071, interface unit 3063, and control link 3058, to control the operation of a DACS interconnection fabric 3062. The control communication between SMP 3045 and DACS controller 3061 uses one or more reserved time slots from TSIU 3031 on PCT link 3071. Fabric 3062 has a plurality of ports and provides crossconnections between ports at DS1, DS3, OC-3 and OC-12 rates, for example, among interface units such as units 3063–3069. DNU 3059 is used to perform conventional crossconnection functions, performed by separate DACS systems in the prior art, such as interconnecting DS1s between other switching systems and crossconnect systems. DNU 3059 also interconnects DS1 multiplexes from transmission facilities 3060, 3070 via PCT links to SM-3000 and SM-3000' for DS0 switching. DNU 3059 is also used to interconnect remote terminal RT-3000, via a fiber link 3122 in accordance with Bellcore Technical Reference TR303, with SM-3000. The number of PCT links between DNU 3059 and SM-3000 is engineered based on the required traffic.

DNU 3059 is usable to provide semi-permanent connectivity between SM-3000 and SM-3000' for use in handling some of the inter-module call traffic, without requiring the use of the individually switched connections through CM 3055. For example, in one alternative, all inter-module calls are routed through DNU 3059, and CM 3055 is used only when the semi-permanent connectivity through DNU 3059 is all being used for other calls.

DNU 3059 is also usable to provide real-time, switched broadband connections between broadband terminals BT-3000 and BT-3000'. DS1 is sometimes referred to as "wideband" and DS3 as "broadband", while standard 64 kilobits per second voice channels are referred to as "narrowband". Herein, the term "broadband" refers to a bandwidth greater than that of the standard 64 kilobits per second voice channels. In response to a call request for a real-time, switched broadband connection between broadband terminals BT-3000 and BT-3000', SMP 3045 controls, via DACS controller 3061, the DACS interconnection fabric 3062 to interconnect the interface units 3066 connected to broadband terminals BT-3000 and BT-3000' via broadband links 3091 and 3092 respectively. Illustratively, the call requests are receivable on the broadband links 3091 and 3092.

RT-3000 includes an AIU 3117 for interfacing POTS, ISDN, and special lines 3118 with time slots on link 3122. AIU 3117 has time slot interchange capability such that a group of 24 special lines, for example, are combined within a single DS1 multiplex on link 3122 and crossconnected by DNU 3059 with a transmission facility to another switching system, without being switched through SM-3000. Lines 3118 may include metallic and/or optical fiber lines. RT-3000 operates as a digital loop carrier system in the manner of the AT&T SLC® carrier systems. All the circuits from RT-3000 that are to be individually switched by SM-3000 are crossconnected via fabric 3062 to interface unit 3063, which performs framing functions and terminates a derived data link for control messages from AIU 3117. Interface unit 3063 also performs overhead processing for SONET streams received via facilities 3060, 3070. The message processing from such streams is performed by SMP 3045.

RSM-3000 comprises SM-3000" and DNU 3059'. SM-3000", which is substantially identical to SM-3000, is connected via DNU 3059' fiber links 3121, and DNU 3059 to SM-3000, which operates as a host switching module in the manner described in U.S. Pat. No. 4,550,404 issued to M. M. Chodrow et al., on Oct. 29, 1985. Alternatively, SM-3000" may be connected directly via links 3121 to CM 3055 for operation as an optical remote module.

DNU 3059', which is substantially identical to DNU 3059, includes a DACS controller 3061', which operates in response to commands from SMP 3047 via PCT link 3071', interface unit 3063', and control link 3058', to control the operation of a DACS interconnection fabric 3062'. Fabric 3062' has a plurality of ports and provides crossconnections between ports at DS1, DS3, OC-3 and OC-12 rates, for example, among interfaces units such as units 3063', 3064', 3065'. DNU 3059' is used to interconnect remote terminal RT-3000', via a fiber link 3122' in accordance with Bellcore Technical Reference TR303, with SM 3000". The number of PCT links between DNU 3059' and SM-3000" is engineered based on the required traffic.

Remote terminal RT-3000', which includes an AIU 3117' for interfacing POTS, ISDN, and special lines 3118' with time slots on link 3122', is substantially identical to remote terminal RT-3000.

AM 3052 performs the functions of AM 4000 (FIG. 8) of the prior art system, and further includes a processor referred to as a local operations manager (LOM) 3053 to interface operations support systems (OSSs) for both switching systems and crossconnect systems as well as to the craft interface used in controlling, in an integrated fashion, the operations, administration, maintenance, and provisioning (OAM&P) functions, for both the switching system and the interconnect arrangement (DNU 3059).

The call processing methods relating to the processing of calls to multi-port hunt groups, i.e., trunk groups and multi-line hunt groups, and relating to the independent processing of intra-SM and inter-SM calls and the separate storing and accessing of first switch path availability data and second switch path availability data as described above with respect to system 11000 (FIG. 4) are also applicable to central office wire center CO-3000 (FIGS. 11a, 11b, 11c). Since the SMs are substantially larger in central office wire center CO-3000, there will typically be correspondingly fewer SMs in an office; accordingly, a higher fraction of all calls will be intra-SM calls. In central office wire center CO-3000, the distribution of trunk group members across SMs may be effected by DNU 3059.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. In a switching system for providing switched connections among a plurality of ports including a plurality of multi-port hunt groups, said switching system comprising a plurality of distributed switch means each associated with a corresponding subset of said ports and for providing switched connections to and from the corresponding subset of said ports, and central switch means for providing switched connections among said distributed switch means, a method of processing a call to one of said groups from an originating one of said ports associated with one of said distributed switch means comprising
   A) in response to said call, determining whether there is a port associated with said one distributed switch means that is a member of said one group and that is also presently available,
   B) upon determining a port in step A), assigning said port determined in step A) to said call,
   C) upon determining no port in step A), determining whether there is a port associated with another one of said distributed switch means that is a member of said one group and that is also presently available, and
   D) upon determining a port in step C), assigning said port determined in step C) to said call.

2. A method in accordance with claim 1 wherein said switching system further comprises control means for controlling the establishment of calls by said switching system, said control means comprising central control means and a plurality of distributed control means, one of said distributed control means being associated with said one distributed switch means, and wherein step A) is performed by said one distributed control means.

3. A method in accordance with claim 2 wherein step C) is performed by said central control means.

4. A method in accordance with claim 2 wherein said central control means stores port availability data for said plurality of ports, said one distributed control means stores port availability data for the subset of ports associated with said one distributed switch means, and wherein step B) comprises
   B1) said one distributed control means assigning said port determined in step A) to said call,
   B2) said one distributed control means marking as unavailable in its stored port availability data said port determined in step A),
   B3) said one distributed control means transmitting a message to said central control means defining the assignment of said port determined in step A) to said call, and B4) in response to said message, said central control means marking as unavailable in its stored port availability data said port determined in step A).

5. A method in accordance with claim 4 further comprising before step B4), said central control means, in response to another call to said one group, preliminarily assigning said port determined in step A) to said another call subject to confirmation of availability from said one distributed control means, after said preliminarily assigning, reading the port availability data stored by said one distributed control means and determining that said port determined in step A) is already marked as unavailable, and in response to said determined unavailability of said port determined in step A), said central control means cancelling said preliminary assignment of said port determined in step A) to said another call.

6. A method in accordance with claim 4 wherein said assigning of step B1) is subject to confirmation of said port selected in step A) being marked available in the port availability data stored by said central control means.

7. A method in accordance with claim 1 wherein said switching system further comprises control means for controlling the establishment of calls by said switching system, said control means comprising central control means and a plurality of distributed control means, one of said distributed control means being associated with said one distributed switch means, and wherein step A) is performed by said central control means.

8. A method in accordance with claim 1 further comprising
E) upon determining said port in step A), providing a switched connection from said originating port through said one distributed switch means to said port determined in step A).

9. A method in accordance with claim 1 further comprising
E) upon determining said port in step C), providing a switched connection from said originating port through said one distributed switch means, said central switch means, and said another distributed switch means to said port determined in step C).

10. A method in accordance with claim 1 wherein said switching system further comprises control means for controlling the establishment of calls by said switching system, said control means storing first switch path availability data for a first set of path resources of said switching system for use only for switched connections between different ports of said subset of said ports associated with said one distributed switch means, and storing second switch path availability data for a second set of path resources of said switching system for use only for switched connections between ports of different ones of said subsets of said ports, said method further comprising
E) upon determining said port in step A), accessing only said first switch path availability data to determine available path resources of said first set, and using said determined available path resources of said first set to provide a switched connection from said originating port through said one distributed switch means to said port determined in step A).

11. A method in accordance with claim 10 wherein said one distributed switch means comprises a time switch, and said first and second sets of path resources comprise time slots.

12. A method in accordance with claim 10 wherein said control means comprises central control means and a plurality of distributed control means, one of said distributed control means being associated with said one distributed switch means, and where said first switch path availability data accessed in step E) is stored by said central control means.

13. A method in accordance with claim 10 wherein said control means comprises central control means and a plurality of distributed control means, one of said distributed control means being associated with said one distributed switch means, and where said first switch path availability data accessed in step E) is stored by said one distributed control means.

14. A method in accordance with claim 1 wherein said switching system further comprises control means for controlling the establishment of calls by said switching system, said control means storing first switch path availability data for a first set of path resources of said switching system for use only for switched connections between different ports of said subset of said ports associated with said one distributed switch means, and storing second switch path availability data for a second set of path resources of said switching system for use only for switched connections between ports of different ones of said subsets of said ports, said method further comprising
E) upon determining said port in step C), accessing only said second switch path availability data to determine available path resources of said second set, and using said determined available path resources of said second set to provide a switched connection from said originating port through said one distributed switch means, said central switch means, and said another distributed switch means to said port determined in step C).

15. A method in accordance with claim 1 wherein said plurality of ports includes trunks, and said one group is a trunk group selected to reach a destination specified for said call.

16. A method in accordance with claim 1 wherein said plurality of ports includes lines, and said one group is a multi-line hunt group corresponding to a destination specified for said call.

17. In a switching system for providing switched connections among a plurality of ports, said switching system comprising a plurality of distributed switch means each associated with a corresponding subset of said ports and for providing switched connections to and from the corresponding subset of said ports, and central switch means for providing switched connections among said distributed switch means, said switching system further comprising control means for controlling the establishment of calls by said switching system, said control means storing switch path availability data for a set of path resources associated with one of said distributed switch means, a method of processing a request for a connection between any first port of said subset of said ports associated with said one distributed switch means and any second port of said plurality of ports comprising
storing said switch path availability data separately as first switch path availability data for a first subset of said set of path resources, and second switch path availability data for a second subset of said set of path resources, in response to said request, determining whether said second port is included in said subset of said ports associated with said one distributed switch means, upon determining that said second port is included in said subset of said ports associated with said one distributed switch means, accessing only said first switch path availability data to determine an available path of said first subset of path resources for use for said requested connection, and upon determining that said second port is not included in said subset of said ports associated with said one distributed switch means, accessing only said second switch path availability data to determine an available path of said second subset of path resources for use for said requested connection.

18. A method in accordance with claim 17 wherein said control means comprises central control means associated with said central switch means, and a plurality of distributed control means, one of said distributed control means being associated with said one distributed switch means, wherein said first switch path availability data is stored by said one distributed control means, and said second switch path availability data is stored by said central control means.

19. A method in accordance with claim 17 wherein said control means comprises central control means associated with said central switch means, and a plurality of distributed control means, one of said distributed control means being associated with said one distributed switch means, wherein said first switch path availability data is stored by said central control means, and said second switch path availability data is stored by said central control means.

20. In a switching system for providing switched connections among a plurality of ports, said switching system comprising a plurality of distributed switch means each associated with a corresponding subset of said ports and for providing switched connections to and from the corresponding subset of said ports, and central switch means for providing switched connections among said distributed switch means, said switching system further comprising control means for controlling the establishment of calls by said switching system, said control means storing switch path availability data for a set of path resources associated with one of said distributed switch means, each path resource of said set being usable for switched connections between any port of said subset of said ports associated with said one distributed switch means and any port of said plurality of ports, said set of path resources comprising first and second disjoint subsets of path resources, a method of processing a request for a connection between any first port of said subset of said ports associated with said one distributed switch means and any second port of said plurality of ports comprising in response to said request, determining whether said second port is included in said subset of said ports associated with said one distributed switch means, upon determining that said second port is included in said subset of said ports associated with said one distributed switch means, selecting a path resource from only said first subset of path resources for use for said requested connection, and upon determining that said second port is not included in said subset of said port associated with said one distributed switch means, selecting a path resource from only said second subset of path resources for use for said requested connection.

21. A method in accordance with claim 20 further comprising storing said switch path availability data separately as first switch path availability data for said first subset of path resources, and second switch path availability data for said second subset of path resources, said selecting a path resource from only said first subset of path resources comprises accessing only said first switch path availability data, and said selecting a path resource from only said second subset of path resources comprises accessing only said second switch path availability data.

22. A method in accordance with claim 21 wherein said control means comprises central control means associated with said central switch means, and a plurality of distributed control means, one of said distributed control means being associated with said one distributed switch means, wherein said first switch path availability data is stored by said one distributed control means, and said second switch path availability data is stored by said central control means.

23. A method in accordance with claim 21 wherein said control means comprises central control means associated with said central switch means, and a plurality of distributed control means, one of said distributed control means being associated with said one distributed switch means, wherein said first switch path availability data is stored by said central control means, and said second switch path availability data is stored by said central control means.

* * * * *